United States Patent
Barker et al.

(10) Patent No.: US 6,567,174 B1
(45) Date of Patent: May 20, 2003

(54) OPTICAL ACCELEROMETER AND ITS USE TO MEASURE ACCELERATION

(75) Inventors: Delmar L. Barker, Tucson, AZ (US); Harry A. Schmitt, Tucson, AZ (US); Stephen M. Schultz, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 94 days.

(21) Appl. No.: 09/796,329

(22) Filed: Feb. 28, 2001

(51) Int. Cl.[7] ............................................. G01P 15/02
(52) U.S. Cl. ............... 356/491; 356/35.5; 356/519; 356/521; 73/514.26; 73/514.27
(58) Field of Search ............... 356/35.5, 491, 356/519, 521; 73/514.26, 514.27

(56) References Cited

U.S. PATENT DOCUMENTS

| | | | | |
|---|---|---|---|---|
| 3,786,681 A | * | 1/1974 | Kiehn | ................... 73/382 R |
| 3,800,594 A | * | 4/1974 | Hutchings et al. | ........ 73/514.27 |
| 4,048,859 A | * | 9/1977 | Babcock | ................... 73/514.27 |
| 4,233,847 A | * | 11/1980 | Walker | ..................... 73/514.27 |
| 4,422,331 A | * | 12/1983 | Walker | ..................... 73/514.27 |
| 4,595,830 A | * | 6/1986 | McMahon | ............. 250/227.21 |
| 4,648,274 A | * | 3/1987 | Trainer | ..................... 73/514.26 |
| 5,557,692 A | * | 9/1996 | Pan et al. | ...................... 385/11 |

* cited by examiner

Primary Examiner—Robert H. Kim
Assistant Examiner—Allen C. Ho

(57) ABSTRACT

A method for measuring acceleration uses an accelerometer apparatus having an optically transparent, stress-birefringent material, a source of polarized light positioned to direct a polarized beam of light into the optically transparent, stress-birefringent material, and a detector system positioned to detect an output beam from the optically transparent, stress-birefringent material. The accelerometer apparatus is accelerated, and the acceleration of the accelerometer apparatus is simultaneously determined from a measurement of stress-induced optical birefringence in the optically transparent, stress-birefringent material.

12 Claims, 4 Drawing Sheets

OPTICAL ACCELEROMETER AND ITS USE TO MEASURE ACCELERATION

This invention relates to an accelerometer, and more particularly, to an optical accelerometer based on the measurement of stress birefringence in an optically transparent, stress-birefringent material.

BACKGROUND OF THE INVENTION

The acceleration of an object may be measured for several purposes. The velocity and position of the object may be calculated as the first and second integrals of acceleration as a function of time. The acceleration may also be used as a control parameter to ensure that the acceleration of the object does not exceed permissible limits.

A powered missile may be launched from a stationary source, from a moving object, or by firing it from a gun as a projectile that subsequently becomes powered. In each case, the downrange and lateral positions of the missile are determined by measuring its three-axis acceleration as a function of time and then calculating the second integral of the acceleration. The accelerations of the missile may be as high as hundreds or even over one thousand "g's", where one "g" is the acceleration due to gravity, 9.8 m/sec$^2$. The acceleration-measurement apparatus must therefore be highly accurate and operable over a wide range of accelerations.

Available apparatus for the measurement of acceleration operates electromechanically or electrically. The electromechanical apparatus may not respond sufficiently quickly for applications such as the measurement of acceleration in a missile, particularly a missile initially fired as a projectile. Both the electromechanical and electrical accelerometers are susceptible to error induced by external environmental effects such as radiation.

There is therefore a need for an accelerometer that is accurate, fast acting, operable over a wide range of accelerations, and robust. The present invention fulfills this need, and further provides related advantages.

SUMMARY OF THE INVENTION

The present invention provides an accelerometer that is based on optical principles and optical measurements, and a method for its use. The accelerometer operates with a very high response rate and is accurate from zero acceleration to accelerations of over 1000 g's. It is robust both electronically and mechanically. The accelerometer may function to measure acceleration in a single axis, with three of the accelerometers used to obtain three-axis acceleration values. Other embodiments provide three-axis measurement of acceleration in a single device.

In accordance with the invention, a method for measuring acceleration comprises the steps of providing an accelerometer apparatus comprising an optically transparent, stress-birefringent material, accelerating the accelerometer apparatus, and simultaneously determining the acceleration of the accelerometer apparatus from a measurement of stress-induced optical birefringence in the optically transparent, stress-birefringent material.

More specifically, a method for measuring acceleration comprises the steps of providing an accelerometer apparatus comprising an optically transparent, stress-birefringent material, a source of polarized light positioned to direct a polarized beam of light into the optically transparent, stress-birefringent material, and a detector system positioned to detect an output beam from the optically transparent, stress-birefringent material. The apparatus is accelerated, and the acceleration of the accelerometer apparatus is simultaneously determined from a measurement of stress-induced optical birefringence in the optically transparent, stress-birefringent material.

Two embodiments of the optical accelerometer are of particular interest. In a first embodiment, a 90-degree prism is formed of an optically transparent, stress-birefringent material. The prism has a first prism side and a second prism side adjacent to a right angle of the prism, and a prism hypotenuse side opposite to the right angle of the prism. A laser optical source produces a polarized beam directed normal to the prism hypotenuse side and toward an incident location of the first prism side. A diffraction grating is in contact with the first prism side at the incident location, and an imaging detector is positioned to receive a diffracted beam from the diffraction grating. An intensity detector is positioned to receive a reflected beam that travels in a reflected beam path from the laser optical source, reflects from the incident location of the first prism side, reflects from the second prism side, and passes through the prism hypotenuse side. A polarizer is positioned along the reflected beam path between the prism hypotenuse side and the intensity detector. A weight may be attached to at least one of the first prism side and the second prism side to improve the resolution of the accelerometer.

In a second embodiment, an accelerometer apparatus comprises an optically transparent, stress-birefringent material. The optically transparent, stress-birefringent material has a first side and a parallel second side. There is a partially reflecting layer on the first side of the optically transparent, stress-birefringent material, and a reflecting layer on the second side of the optically transparent, stress-birefringent material. The partially reflecting layer reflects a reflected portion of an incident beam and transmits a transmitted portion of the incident beam. A laser optical source has a polarized beam directed into the optically transparent, stress-birefringent material at an input location, so that the beam undergoes multiple internal reflections between the partially reflecting layer and the reflecting layer, with a transmitted portion of the beam energy passing through the partially reflecting layer at each reflection therefrom. There is a beam modification structure external to the optically transparent, stress-birefringent material, through which the transmitted portions of the beam energy pass. The beam modification structure includes a quarter wave plate and a polarizer. There are at least two intensity digitizing detectors, each digitizing detector being positioned to receive a respective one of the transmitted portions of the beam energy that pass through the beam modification structure. A weight may be attached to a side of the optically transparent, stress-birefringent material other than the first side and the second side. Most preferably, one of the digitizing detectors is positioned to receive a transmitted portion of the beam energy at each of the $2^n$ reflections, where n is an integer ranging from n=1 to n=m and m is an integer expressing maximum resolution, to provide a direct digital readout of the acceleration.

The optical accelerometer has no mechanical movements and is highly responsive over a wide range of accelerations. Other features and advantages of the present invention will be apparent from the following more detailed description of the preferred embodiment, taken in conjunction with the accompanying drawings which illustrate, by way of example, the principles of the invention. The scope of the invention is not, however, limited to this preferred embodiment.

DETAILED DESCRIPTION OF THE INVENTION

Figure 1:
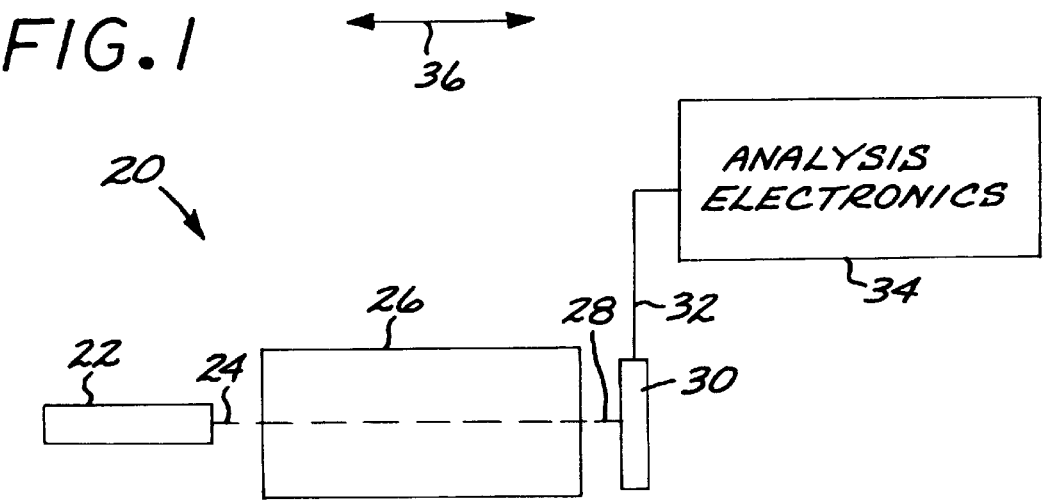
FIG. 1 is a general schematic representation of an optical accelerometer.

FIG. 1 depicts in general form an accelerometer apparatus 20 based on optical stress birefringence. A source of polarized light 22 directs a beam of polarized light 24 through an optically transparent, stress-birefringent material 26. That is, the material must be transparent to the light wavelength of the polarized light 22, and it must be birefringent when stressed, in this case by an acceleration. The optically transparent, stress-birefringent material 26 may be a crystalline or a non-crystalline material. A number of optically transparent, stress-birefringent crystals are known, such as, for example, calcite and lithium niobate. Other stress-birefringent materials include, for example, some plastics, gelatine, and liquid crystals.

A transmitted beam 28 passes through the optically transparent, stress-birefringent material 26 and is detected by a detector 30. A detector output signal 32 is provided to analysis electronics 34. Acceleration of the accelerometer apparatus 20 along a measurement axis, indicated schematically by the arrows 36, causes the optically transparent, stress-birefringent material 26 to deform, producing a birefringence pattern that is detected by the detector 30 and analyzed to determine the magnitude and direction of the acceleration 36. This form of apparatus is generally operable to measure acceleration along a single axis 36, and it may be extended with additional apparatus to measure acceleration along other axes.

Figure 2:
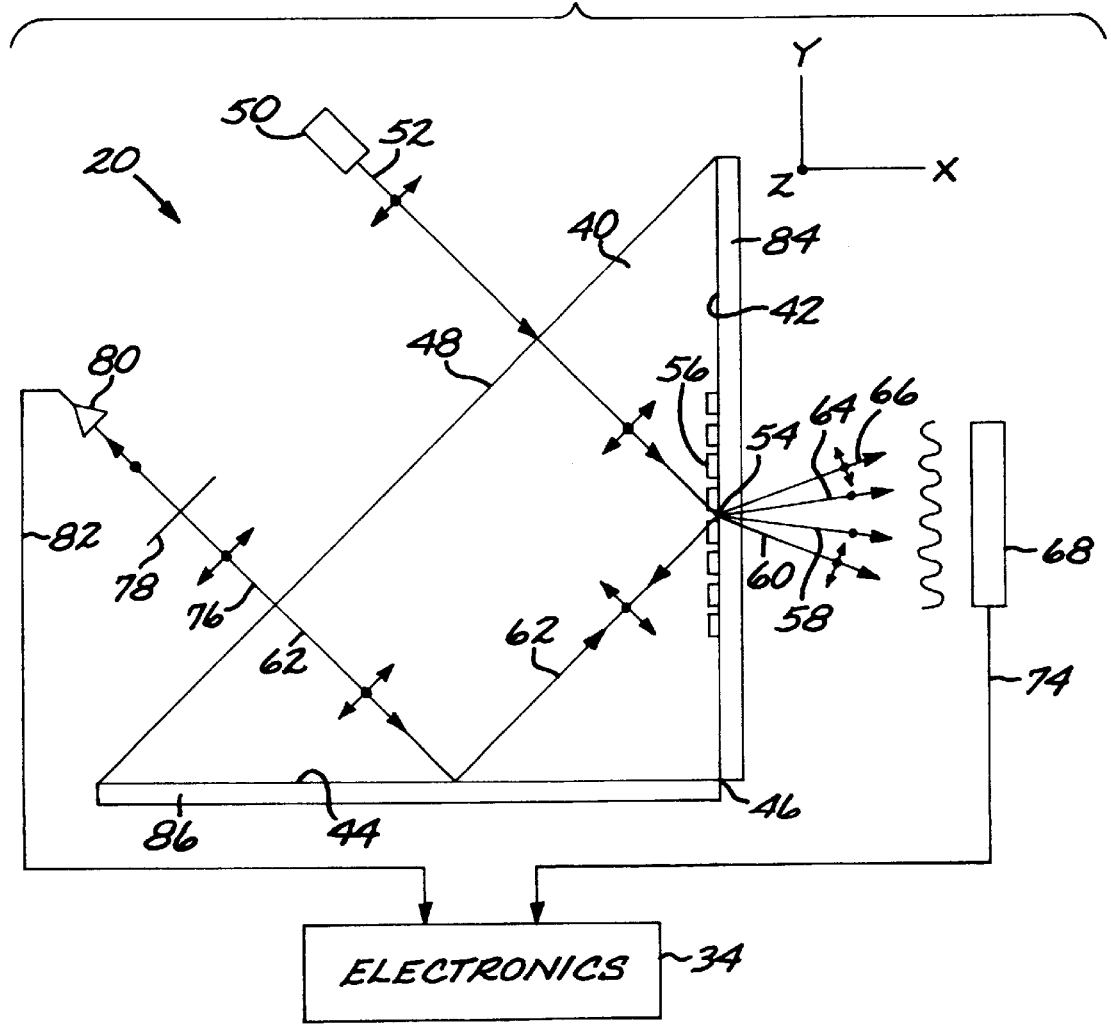
FIG. 2 is a schematic representation of a first preferred embodiment of the optical accelerometer.

FIG. 2 depicts in greater detail an embodiment of this approach. The accelerometer apparatus 20 includes a 90-degree equilateral prism 40 formed of the optically transparent, stress-birefringent material. The prism 40 has a first prism side 42 and a second prism side 44 (of equal length to the first prism side 42) adjacent to a right angle 46 of the prism 40, and a prism hypotenuse side 48 opposite to the right angle 46 of the prism 40. A laser optical source 50 produces a polarized light beam 52 directed normal (perpendicular) to the prism hypotenuse side 48 and toward an incident location 54 of the first prism side 42. The laser optical source 50 may produce a polarized beam, or a separate polarizer may be provided in the beam path prior to the beam 52 entering the prism 40. The polarization of the beam 52 is at 45 degrees incident to the surface of the prism hypotenuse side 48. That is, the energy of the beam 52 is divided into two orthogonal polarization states, the transverse electric (TE) polarization state with the electric field perpendicular to the plane of the prism shown in FIG. 2 (i.e., perpendicular to the plane of the page shown in FIG. 2), and the transverse magnetic (TM) polarization state lying in the plane of the prism (i.e., lying in the plane of the page of FIG. 2). There is a diffraction grating 56 in contact with the first prism side 42 at the incident location 54, oriented so that the grid lines extend out of the plane of the page in FIG. 2.

A first portion of the beam 52 that is incident at an angle of +45 degrees upon the diffraction grating 56 is diffracted by the diffraction grating 56. Because the two polarization states diffract differently, there is a first diffracted TE polarized wave 58 and a first diffracted TM polarized wave 60.

A second portion of the beam 52 that is incident upon the diffraction grating 56 reflects therefrom as a reflected beam 62 having both polarization states. The reflected beam 62 reflects from the second side 44. A portion of the reflected beam 62 reflects from the internal surface of the prism hypotenuse side 48, back to the second side 44, and back to the diffraction grating 56 at the first prism side 42 at an incident angle of −45 degrees. A portion of the reflected beam 62 is diffracted by the diffraction grating 56 to produce a second diffracted TE polarized wave 64 and a second diffracted TM polarized wave 66.

That is, there are four diffracted waves produced by the diffraction grating 56. The propagation angles of the diffracted waves depend upon the period of the diffraction grating 56 and on the refractive index of the prism 40 for the various waves. The refractive indices of the two diffracted TE-polarized waves 58 and 64 are identical since the electric field vectors are parallel. The diffraction angles of the two diffracted TE-polarized waves are equal but opposite as shown in FIG. 2. On the other hand, the electric field vectors of the two diffracted TM-polarized waves 60 and 66 differ by 90 degrees. The propagation angles of these diffracted TM-polarized waves 60 and 66 may be different.

The three orthogonal components (i.e., in the x, y, and z directions) of refractive index change, and thence the three orthogonal components of the acceleration experienced by the accelerometer apparatus 20, may be calculated from the propagation angles of the two diffracted TM-polarized waves 60 and 66 and the propagation angle of one of the diffracted TE-polarized waves 58 and 64 (since the propagation angles of these two diffracted TE-polarized waves are the same). The refractive index changes are small, but they may be increased somewhat by adding weights 84 and 86 to the prism 40 along the respective prism sides 42 and 44 (with an opening therethrough for the beam passage in the weight 84 on the first prism side 42). Even with the added weights, the change in the refractive indices are typically less than $10^{-6}$.

There are two interference patterns associated with the two polarization states. The period of the diffracted TE-interference pattern is proportional to the change of the refractive index $n_z$ in the z direction (out of the plane of the page in FIG. 2). The period of the diffracted TM-interference pattern is proportional to the sum of the changes in the refractive indices $(n_x+n_y)$ in the plane of the page in FIG. 2.

Figure 3:
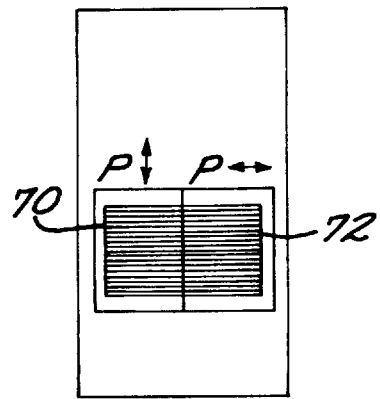
FIG. 3 is a schematic depiction of an interference pattern produced by the diffraction grating of the apparatus of FIG. 2.

The very small angular changes associated with this small change in refractive indices are measured by interfering the beams and measuring the interference patterns. To do so, an imaging detector 68 such as a focal plane array (FPA) is positioned to receive the four diffracted beams from the diffraction grating 56. At the imaging detector 68, the two diffracted TE polarized waves 58 and 64 interfere with each other, producing a TE polarization interference pattern 70 shown in FIG. 3. Similarly, the two TM polarized waves 60 and 66 interfere with each other, producing a TM polarization interference pattern 72. An output signal 74 of the imaging detector 68 is provided to the analysis electronics 34.

Figure 4:
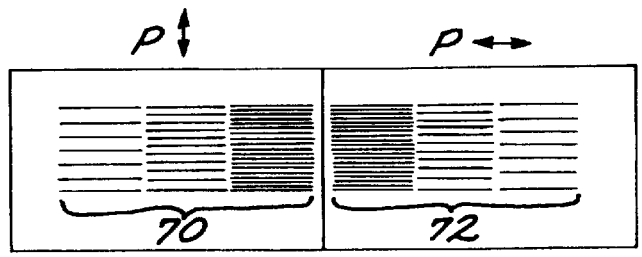
FIG. 4 is a schematic depiction of sets of interference patterns produced by diffraction gratings of different line spacings in the apparatus of FIG. 2.

The accuracy for various acceleration ranges is dependent upon the grating periods of the diffraction grating 56. The spacings of the lines of the interference pattern may be altered by using diffraction gratings 56 of different grid periods. FIG. 4 illustrates different spacings of the interference patterns 70 and 72 obtained from different diffraction gratings 56 of different periods. In practice, the diffraction grating 56 at the incident location 54 may have several different regions of different spacings of the gratings to produce the multiple patterns shown in FIG. 4.

It will be recalled that a portion of the reflected beam 62 reflects from the internal surface of the prism hypotenuse side 48. A transmitted portion 76 of the reflected beam 62 passes through the prism hypotenuse side 48. The transmitted portion 76 is passed through a polarizer 78 with a polarization direction out of the plane of the page in FIG. 2. The intensity of the transmitted portion 76 after passing through the polarizer 78 is measured by an intensity detector 80. This intensity is a measure of the phase of the undiffracted beam that is the transmitted portion 76. An output signal 82 of the detector 80 is provided to the analysis electronics 34.

The components of the acceleration are determined using computations performed by the analysis electronics 34 from the input information described previously. Where there is zero acceleration, the refractive index of the stress-birefringent material of the prism 40 is isotropic, that is, independent of direction. Acceleration causes a change in the propagation of the light in the stress-birefringent material of the prism 40 so that the refractive index is dependent upon the direction of the electric field, where the optic axis is in the direction of acceleration. The acceleration is divided into a component in the z direction perpendicular to the plane of FIG. 2, $a_z$, and a component in the x-y plane, $a_{xy}$. The electric field of the TE polarization is in the z-direction and has a refractive index given by $n_z=n_g+K/E(\rho h a_z - \mu \rho h a_{xy})$, where $n_g$ is the unstressed refractive index, K is the strain optic coefficient for the birefringent crystal, E is the modulus of elasticity of the birefringent crystal, $\mu$ is the Poisson ratio, h is the thickness of the applied weight, and $\rho$ is the density of the applied weight. The value of $n_z$ is determined by measuring the, fringe period of the TE interference pattern as given by $n_z=2^{1/2}(\lambda/2\Lambda_f+\lambda/\Lambda_g)$, where $\lambda$ is the free space wavelength of the laser beam 52, $\Lambda_f$ is the period of the interference pattern, and $\Lambda_g$ is the period of the diffraction grating 56.

Figure 5:
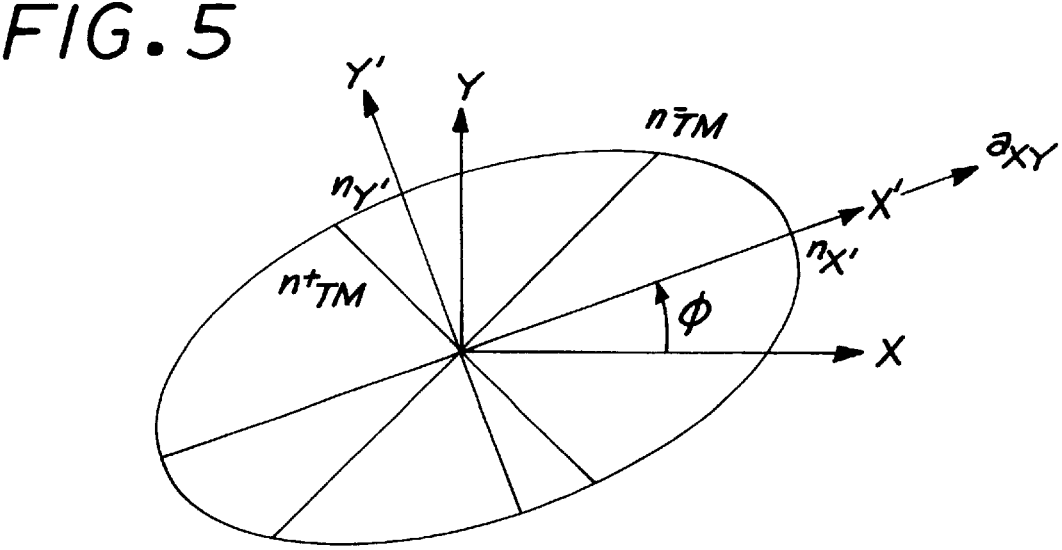
FIG. 5 is acceleration-induced index ellipse used in analyzing the results of the apparatus of FIG. 2.

The electric field direction for the TM polarization depends upon the propagation direction. The refractive index is determined using an index ellipse, such as that depicted in FIG. 5. The major and minor axes of the index ellipse are given by $n_x=n_g+K/E(\rho h a_{xy}-\mu \rho h a_z)$ and $n_y=n_g-K/E(\rho h a_{xy}+\mu \rho h a_z)$. The TM polarized waves traveling in the +y and the −y directions have refractive indices respectively of $n^+_{TM}$ and $n^-_{TM}$. The values of $n^+_{TM}$ and $n^-_{TM}$ are determined by measuring the period of the interference pattern of the TM polarization and the retardation $\Gamma$ of the transmitted portion 76 as given by $n^+_{TM}=-3n_z-\Gamma\lambda/2\pi d-2^{1/2}(\lambda 2/\Lambda_f+2\lambda/\Lambda_g)$ and $n^-_{TM}=-3n_z+\Gamma\lambda/2\pi d-2(2\frac{1}{2})(\lambda/2\Lambda_f+2\lambda/\Lambda_g)$. The values of $n_x$, and $n_y$, are calculated from the values of $n^+_{TM}$ and $n^-_{TM}$ using the index ellipse M of FIG. 5, and d is the length of the sides 42 and 44 of the prism opposite the hypotenuse. The acceleration component $a_{xy}$ and the direction $\phi$ are likewise calculated.

Figure 6:
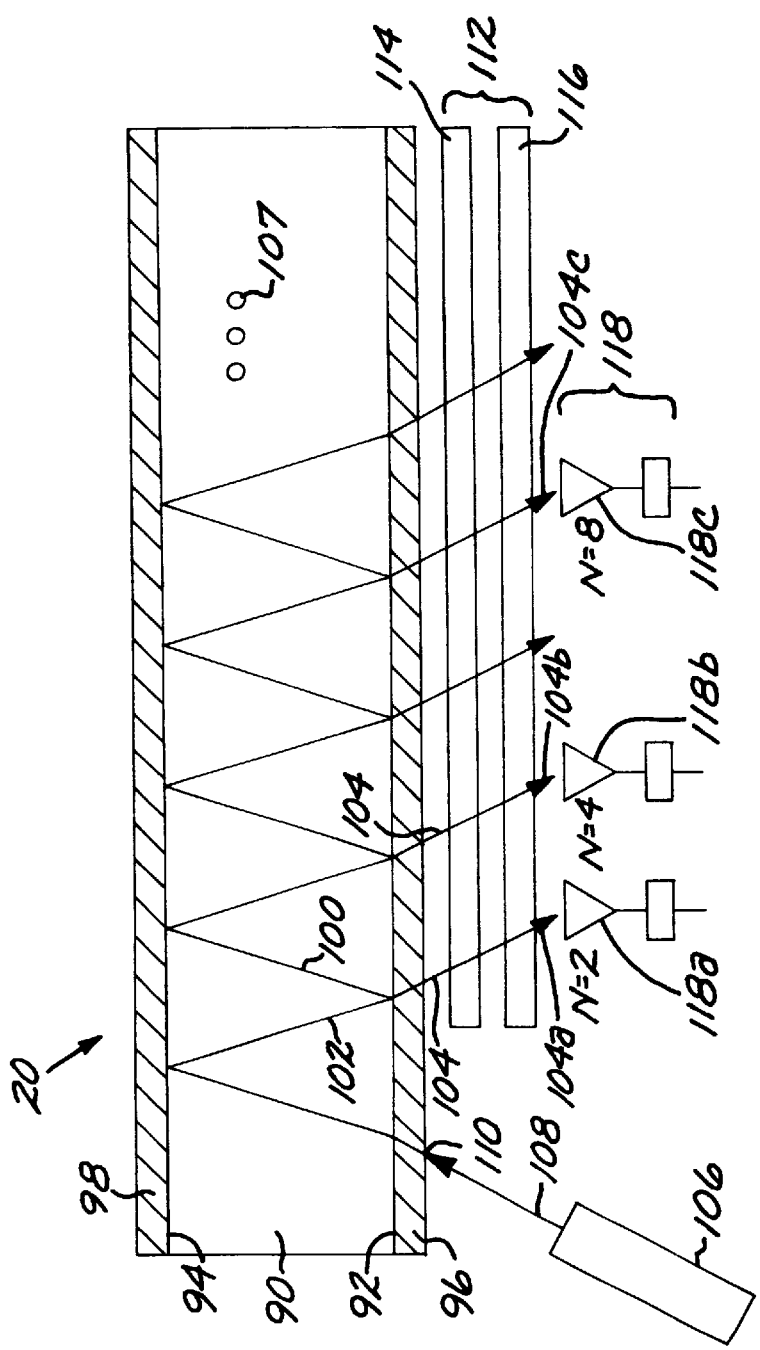
FIG. 6 is a schematic side sectional view of a second preferred embodiment of the optical accelerometer.
Figure 7:
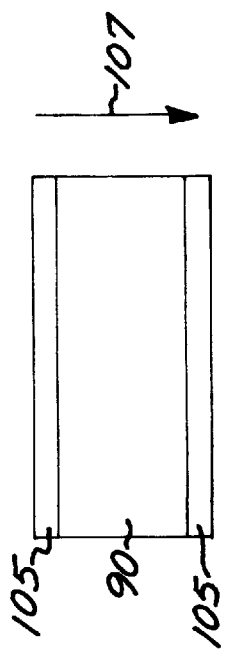
FIG. 7 is a schematic top view of the second preferred embodiment of the optical accelerometer shown in FIG. 6.

FIG. 6 illustrates a second preferred embodiment of the accelerometer apparatus 20. The accelerometer apparatus 20 of FIG. 6 includes an optically transparent, stress-birefringent material 90 having a first side 92 and a parallel second side 94. There is a partially reflecting layer 96 on the first side 92 of the optically transparent, stress-birefringent material 90. There is a reflecting layer 98 on the second side 94 of the optically transparent, stress-birefringent material 90. The partially reflecting layer 96 reflects a reflected portion 100 of an incident beam 102 and transmits a transmitted portion 104 of the incident beam 102. To increase sensitivity and as shown in FIG. 7, weights 105 may be attached to one or both ends of the birefringent crystal 90 that are perpendicular to an acceleration direction 107 (which are not the sides 92 and 94).

A laser optical source 106 produces a polarized beam 108, polarized at 45 degrees, that is directed into the optically transparent, stress-birefringent material 90 at an incident angle between 0 and 90 degrees, at an input location 110. The beam 108, which serves as the incident beam 102 each time it impinges upon the partially reflecting layer 96, undergoes multiple internal reflections between the partially reflecting layer 96 and the reflecting layer 98. The transmitted portion 104 of the beam energy passes through the partially reflecting layer 96 at each reflection therefrom.

A beam modification structure 112 is positioned external to the optically transparent, stress-birefringent material 90, so that the transmitted portions 104 of the beam energy pass through the beam modification structure 112. The beam modification structure includes a quarter wave plate 114 through which the transmitted portion 104 of the beam first passes, and then a polarizer 116 oriented at −45 degrees.

There are at least two intensity digitizing detectors 118. Each digitizing detector 118 is positioned to receive a respective one of the transmitted portions 104 of the beam energy that pass through the beam modification structure 112. FIG. 6 illustrates the case where there are three digitizing detectors 118, detectors 118a, 118b, and 118c, although there could be only two digitizing detectors 118 or more than three digitizing detectors 118. In the preferred approach, one of the digitizing detectors is positioned to receive a transmitted portion of the beam energy at each of the $2^n$ reflections, where n is an integer ranging from n=1 to n=m and m is a resolution integer expressing the maximum resolution. As will be discussed more fully below, when arranged in this manner. n is the number of the binary bit in the direct digital output signal from the detectors 118. In the illustrated case, the detector 118a receives the transmitted portion 104a at $2^1$ reflections (one reflection from the reflection layer 98 and one from the partially reflecting layer 96 that occurs simultaneously with the sampling of the transmitted beam). The detector 118b receives the transmitted portion 104b at $2^2$ (i.e., 4) reflections, and the detector 118c receives the transmitted portion 104c at $2^3$ (i.e., 8) reflections. In this approach, the next detector would be positioned at $2^4$ (i.e., 16) reflections, etc.

As the polarized beam passes through the optically transparent, stress-birefringent material 90, there is a relative change in phase, termed retardation, between the TM and TE polarization wave components that make up the polarized beam. The retardation $\Gamma$ is calculated as $\Gamma=Ch\rho Dk_o a$, where C is the stress optic coefficient, $\rho$ is the density of the weight 105, h is the thickness of the weight 105 D is the total propagation distance, $k_o=2\pi/\lambda$, $\lambda$ is the free space wavelength, and a is the acceleration. The resulting beam intensity after passing through the quarter wave plate 114 and the polarizer 116 is $I=I_o \sin^2(\Gamma/2+\pi/4)$, where $I_o$ is the initial beam intensity. The total propagation distance $D=Nd/\cos\theta$, where N is the number of reflections, d is the thickness of the birefringent crystal 90 between the sides 92 and 94, and $\theta$ is the propagation angle of the laser beam inside the birefringent crystal 90. The measured intensity at detector 118 is $I=I_o(2n \sec(\theta)C h\rho\pi da/\lambda+\pi/4)$, where n is the bit number discussed above. The maximum acceleration that may be measured by this approach is $a_{max}=\lambda/2d \sec(\theta)Ch\rho$, and the resolution is $a_{max}/2m$, where m is the resolution integer.

Figure 8:
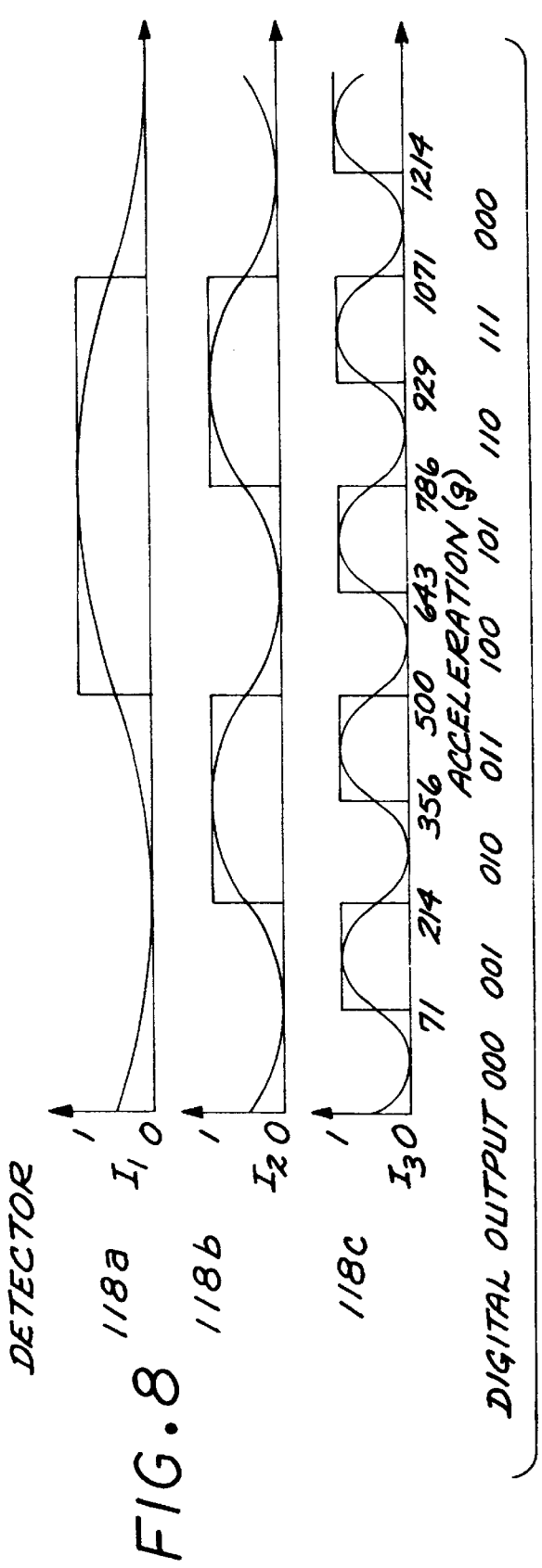
FIG. 8 is a representation of the digital readout of the second preferred embodiment of the optical accelerometer.

This approach has the important advantage that it provides a direct digital readout of the acceleration. FIG. 8 illustrates the digitized readout intensity (the square wave in each case) of each of the three detectors 118*a*–118*c* for the case of three detectors and a maximum acceleration $a_{max}$ of about 1000 g. As noted along the bottom of the figure, the three-digit digital readout provides a direct reading of acceleration without further data processing or mathematical analysis. Improved resolution may be obtained simply by adding more detectors 118 at the additional $2^n$ readout locations, where n is greater than 3. Another important advantage is that the accelerometer apparatus measures the relative difference in refractive index and therefore is insensitive to temperature variations as long as the laser wavelength is maintained constant. The device requires only a single laser beam and simple electronics, and therefore is a low-power device. It is also relatively insensitive to noise because of the direct digital output.

Figure 9:
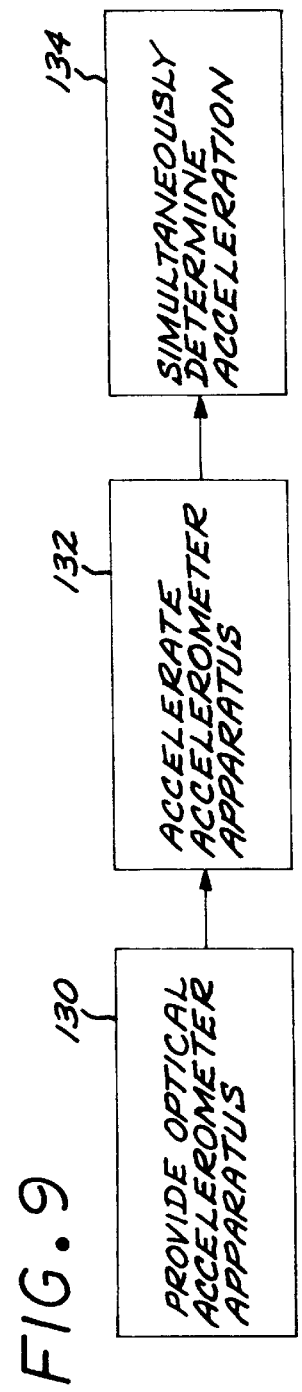
FIG. 9 is a block flow diagram of a method for measuring acceleration.

FIG. 9 is a block flow diagram of a preferred approach for practicing the invention. An optical accelerometer apparatus is provided, numeral 130. The optical accelerometer may be of the types illustrated and discussed herein, such as those of. FIGS. 1, 2, or 6, or of any other operable type. The optical accelerometer apparatus is accelerated, numeral 132. The applications of most interest are those where the maximum accelerations are large, in the range up to 1000 g or higher. Simultaneously with step 132, the acceleration is measured, numeral 134, using the techniques discussed herein.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

What is claimed is:

1. A method for measuring acceleration, comprising the steps of:
    providing an accelerometer apparatus comprising
        a 90-degree prism formed of an optically transparent, stress-birefringent material, the prism having a first prism side and a second prism side adjacent to a right angle of the prism, and a prism hypotenuse side opposite to the right angle of the prism,
        a source of polarized light positioned to direct a polarized beam of light into the optically transparent, stress-birefringent material, the source of polarized light comprising a laser optical source producing a polarized beam directed normal to the prism hypotenuse side and toward an incident location of the first prism side, and
        a detector system positioned to detect an output beam from the optically transparent, stress-birefringent material, the detector system comprising
            a diffraction grating in contact with the first prism side at the incident location,
            an imaging detector positioned to receive a diffracted beam from the diffraction grating,
            an intensity detector positioned to receive a reflected beam that travels in a reflected beam path from the laser optical source, reflects from the incident location of the first prism side, reflects from the second prism side, and passes through the prism hypotenuse side, and
            a polarizer positioned along the reflected beam path between the prism hypotenuse side and the intensity detector;
    accelerating the accelerometer apparatus; and simultaneously
    determining the acceleration of the accelerometer apparatus from a measurement of stress-induced optical birefringence in the optically transparent, stress-birefringent material.

2. The method of claim 1, wherein the optically transparent, stress-birefringent material is a material selected from the group consisting of calcite, lithium niobate, a plastic, gelatine, and a liquid crystal.

3. The method of claim 1, wherein the accelerometer apparatus further includes
    a weight attached to at least one of the first prism side and the second prism side.

4. An accelerometer apparatus comprising:
    a 90-degree prism formed of an optically transparent, stress-birefringent material, the prism having a first prism side and a second prism side adjacent to a right angle of the prism, and a prism hypotenuse side opposite to the right angle of the prism;
    a laser optical source producing a polarized beam directed normal to the prism hypotenuse side and toward an incident location of the first prism side;
    a diffraction grating in contact with the first prism side at the incident location;
    an imaging detector positioned to receive a diffracted beam from the diffraction grating;
    an intensity detector positioned to receive a reflected beam that travels in a reflected beam path from the laser optical source, reflects from the incident location of the first prism side, reflects from the second prism side, and passes through the prism hypotenuse side; and
    a polarizer positioned along the reflected beam path between the prism hypotenuse side and the intensity detector.

5. The apparatus of claim 4, wherein the accelerometer apparatus further includes
    a weight attached to at least one of the first prism side and the second prism side.

6. A method for measuring acceleration, comprising the steps of:
    providing an accelerometer apparatus comprising
        an optically transparent, stress-birefringent material having a first side and a parallel second side,
        a partially reflecting layer on the first side of the optically transparent, stress-birefringent material,
        a reflecting layer on the second side of the optically transparent, stress-birefringent material, the partially reflecting layer reflecting a reflected portion of an incident beam and transmitting a transmitted portion of the incident beam, a source of polarized light positioned to direct a polarized beam of light into the optically transparent, stress-birefringent material, wherein the source of polarized light comprises
- a laser optical source producing a polarized beam directed into the optically transparent, stress-birefringent material at an input location, so that the beam undergoes multiple internal reflections between the partially reflecting layer and the reflecting layer, with a transmitted portion of the beam energy passing through the partially reflecting layer at each reflection therefrom,
- a beam modification structure external to the optically transparent, stress-birefringent material and through which the transmitted portions of the beam energy pass, the beam modification structure including
    - a quarter wave plate, and
    - a polarizer, and
- a detector system positioned to detect an output beam from the optically transparent, stress-birefringent material, the detector system comprising
    - at least two intensity digitizing detectors, each digitizing detector being positioned to receive a respective one of the transmitted portions of the beam energy that pass through the beam modification structure;

accelerating the accelerometer apparatus; and simultaneously determining the acceleration of the accelerometer apparatus from a measurement of stress-induced optical birefringence in the optically transparent, stress-birefringent material.

7. The method of claim 6, wherein the step of determining includes the step of positioning one of the digitizing detectors to receive a transmitted portion of the beam energy at each of the $2^n$ reflections, where n is an integer ranging from n=1 to n=m and m is a resolution integer expressing a maximum resolution.

8. The method of claim 6, wherein the accelerometer apparatus further includes a weight attached to a side of the optically transparent, stress-birefringent material other than the first side and the second side.

9. The method of claim 6, wherein the optically transparent, stress-birefringent material is a material selected from the group consisting of calcite, lithium niobate, a plastic, gelatine, and a liquid crystal.

10. An accelerometer apparatus comprising:

an optically transparent, stress-birefringent material having a first side and a parallel second side;

a partially reflecting layer on the first side of the optically transparent, stress-birefringent material;

a reflecting layer on the second side of the optically transparent, stress-birefringent material, the partially reflecting layer reflecting a reflected portion of an incident beam and transmitting a transmitted portion of the incident beam;

a laser optical source producing a polarized beam directed into the optically transparent, stress-birefringent material at an input location, so that the beam undergoes multiple internal reflections between the partially reflecting layer and the reflecting layer, with a transmitted portion of the beam energy passing through the partially reflecting layer at each reflection therefrom;

a beam modification structure external to the optically transparent, stress-birefringent material and through which the transmitted portions of the beam energy pass, the beam modification structure including
- a quarter wave plate, and
- a polarizer; and at least two intensity digitizing detectors, each digitizing detector being positioned to receive a respective one of the transmitted portions of the beam energy that pass through the beam modification structure.

11. The apparatus of claim 10, wherein one of the digitizing detectors is positioned to receive a transmitted portion of the beam energy at each of the $2^n$ reflections, where n is an integer ranging from n=1 to n=m and m is a resolution integer expressing a maximum resolution.

12. The apparatus of claim 10, wherein the accelerometer apparatus further includes a weight attached to a side of the optically transparent, stress-birefringent material other than the first side and the second side.

* * * * *